Jan. 5, 1932. C. J. OSBORN 1,840,208
CHART
Filed March 7, 1930

CHESTER J. OSBORN
INVENTOR

BY Victor J. Evans
ATTORNEY

WITNESS Lee Smith

Patented Jan. 5, 1932

1,840,208

UNITED STATES PATENT OFFICE

CHESTER J. OSBORN, OF ALTAMONT, NEW YORK

CHART

Application filed March 7, 1930. Serial No. 434,069.

My present invention has reference to a color display chart for use by printers, artists, advertising concerns, etc. My object is the provision of a chart for this purpose of a construction to visualize various combinations of colors in projected printed matter, folders, advertising cards, designs, advertisements, etc.

A further object is the provision of a color display card that will disclose the colors in proportionate areas and positions approximately as they would appear in the finished job and which enables the operator to decide effective color combinations without the necessity of making color sketches or other complicated expedients.

For a full and comprehensive understanding of the improvement, reference is to be had to the accompanying drawings which accompany and form part of this application.

Figure 1:
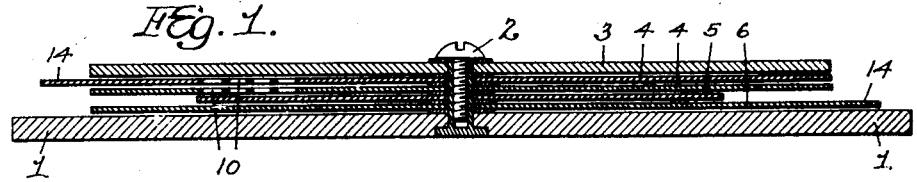
Figure 1 is a sectional view through the improvement on an enlarged scale on the line 1—1 of Figure 2.
Figure 2:
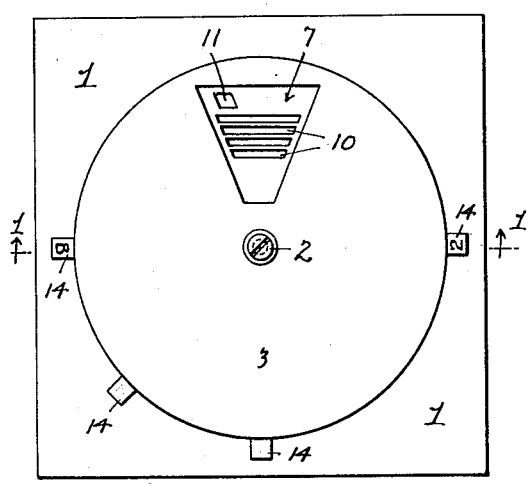
Figure 2 is a face view of the improvement.
Figure 3:
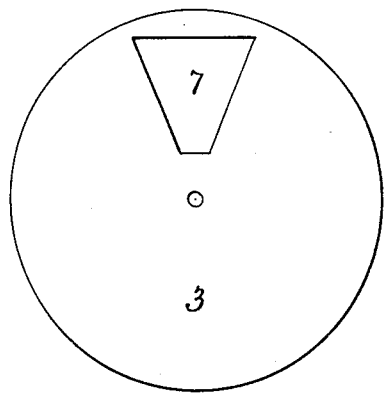
Figure 3 is a plan view of the face disc.
Figure 4:
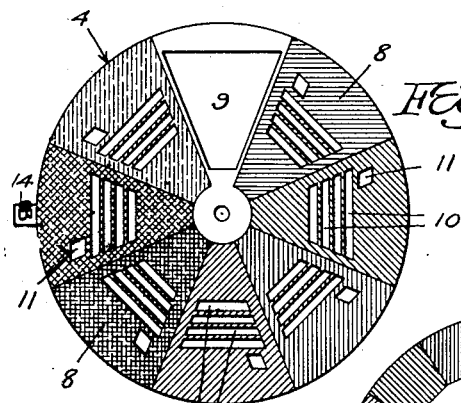
Figure 4 is a similar view of one of the background discs.
Figure 5:
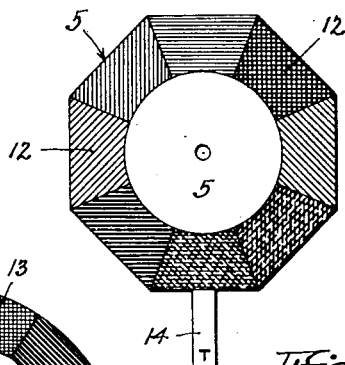
Figure 5 is a similar view of the type disc.
Figure 6:
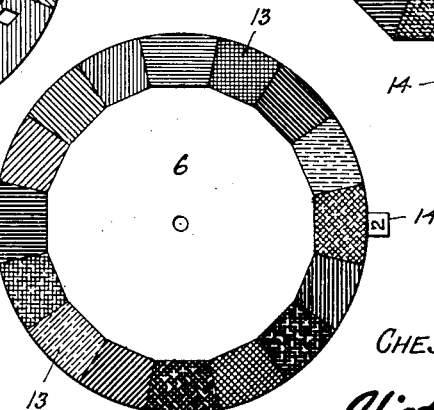
Figure 6 is a similar view of the supplemental or second color disc.

The improvement is arranged upon a suitable base 1, and this base may and preferably is provided with a cover although the same is not illustrated by the drawings.

The improvement contemplates the employment of several discs, each pivotally supported, as at 2, on a common axis. Each disc is subdivided into segmental blocks, each of which is differently colored, and for distinction the discs are individually designated as follows: face disc is indicated by the numeral 3, one or more background discs 4, one type disc 5 and an inner supplemental or second color disc 6.

The face disc 3 is pierced by a segmental window 7. This disc is not colored. Two background discs are preferably employed but as each are of the same construction a description of one will be taken as equally applicable to the other. Each background disc 4 is divided into segmental blocks 8, and as previously stated these blocks are differently colored. One block, however, is formed with a segmental sight opening or window 9 and the remainder of colored segmental blocks 8 are pierced to provide the same with a number of slots 10 approximately in area of an average type display and each colored segmental block 8 is further pierced to provide the same with a small square aperture 11 proportionate in area to the average supplemental color.

The discs 4 are arranged one over the other and are disposed next to the face disc 3. Next to the background disc there is arranged on the pivot 2 the type disc 5. The disc 5 is sufficiently smaller in diameter than the other discs so that when assembled its colored segmental blocks 12 are revealed through the type piercing slots 10 in the background discs 4 and, of course, through the window 7 in the face disc 3 but the colored blocks 12 are not visible through the square apertures 11 in the background discs 4. The inner supplemental or second color disc 6 is of a size equaling that of the background discs 4 and the face discs 3 and has its outer face, adjacent to its periphery provided with segmental blocks 13 which are differently colored, and the color discs 13 are visible through the apertures 11 and, of course, visible through the windows 9 and 7 of the background discs 4 and face discs 3. In the event that more than one of these discs is desired in order to provide a greater number of colors than are available in a single disc an aperture equivalent to one entire segment is pierced in each supplemental color disc except the inner disc 6. The colors on the blocks of the discs vary from the lightest to the deepest shade in order that these colors will blend together. The colored segmental blocks on the background discs or disc 4 are of a less number than those on the type disc 5, and the colored blocks 13 on the secondary colored disc 6 are of a greater number than the blocks on the disc 5.

Each of the discs 4, 5 and 6 is provided with a projection in the nature of a tab.

These tabs are indicated each by the numeral 14 and the tabs have inscribed on the outer faces thereof indicia relative to the type of disc from which the tabs project.

The discs may be individually rotated to bring the same opposite the windows 7 and 9 of the face disc 3 and the background discs 4 or opposite the slots and apertures in the background discs 4, so that the operator can readily visualize various combinations of color in projected printed matter, folders, advertising matter, designs, etc.

Having described the invention, I claim:

A color chart, comprising a base and a plurality of superimposed discs on the base and centrally pivoted to each other and to the base, the disc resting upon the base comprising the secondary color disc having its outer face, for a distance from its perimeter, provided with segmental blocks each of which being differently colored, the next disc comprising the type disc and being of a less diameter than the secondary color disc so that the perimeter of the type disc will be arranged slightly inwardly of the color blocks on the secondary color disc, said type disc, from its perimeter, being divided into segmental blocks which are differently colored, and the colored blocks being less in number than those on the secondary color disc, the next disc being of a size corresponding to that of the secondary color disc and having its outer face divided into segmental blocks which are differently colored and which are of a greater length and less in number than the colored blocks of the type disc and secondary color disc, the last-named disc providing a background disc and the colored blocks thereon being provided with a series of slots to establish windows which communicate with the blocks on the type disc and being further provided with apertures that provide windows for the colored blocks on the secondary color disc, said last named disc, between two of the colored blocks thereon, being provided with a segmental opening affording a comparatively large window, and the outer disc having a window opening therethrough of a size corresponding to that of the window on the last named discs and all of said discs having peripheral extensions in the nature of tabs, which are provided with designating characters to indicate the disc to which each tab is connected.

In testimony whereof I affix my signature.

CHESTER J. OSBORN.